S.C. RIDGAWAY
RAKE FOR HARVESTER.
PATENTED NOV 26 1867

71327

UNITED STATES PATENT OFFICE.

SAMUEL C. RIDGAWAY, OF BALTIMORE, MARYLAND.

IMPROVEMENT IN HARVESTER-RAKES.

Specification forming part of Letters Patent No. 71,327, dated November 26, 1867.

*To all whom it may concern:*

Be it known that I, SAMUEL C. RIDGAWAY, of Baltimore, in the county of Baltimore and State of Maryland, have invented certain new and useful Improvements in Rakes for Harvesters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in operating the rake by means of a cam and an adjustable crank-arm, so as to impart to the rake the desired movement across the platform for the purpose of removing the grain therefrom.

Figure 1:
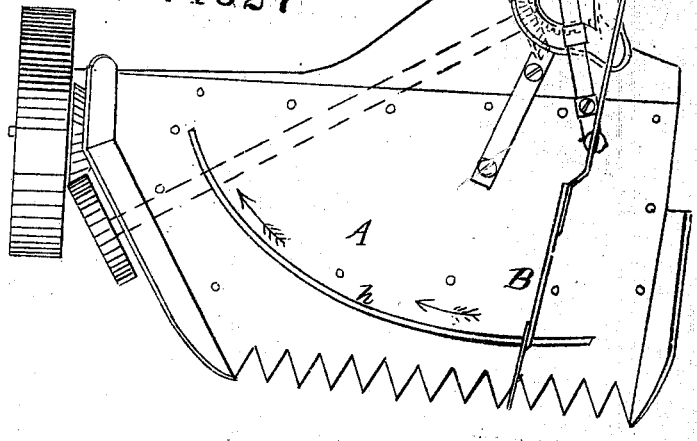
Figure 2:
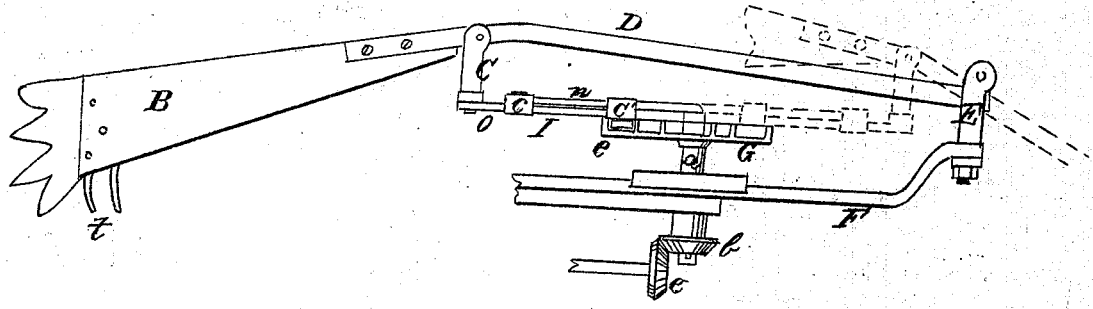

Figure 1 is a top-plan view, and Fig. 2 a side elevation, of the rake and its operating mechanism, shown partly in section.

My invention relates to certain improvements upon the device patented to Thomas Taylor, April 10, 1866. In that the rake was operated by a crank moving in a circle, and it was found, in practice, that the rake, at the beginning of its movement across the front of the platform, had a tendency to push the cut grain forward into or upon the standing grain, in consequence of the circular motion of the rake at that point, causing it to move forward as well as sidewise.

To remedy this difficulty, and impart to the rake such a movement as will cause it to move sidewise from the inner front corner of the platform, is the object of my present invention.

I construct the platform A and the rake B as described in the patent referred to, and shown in the drawings filed herewith. Instead, however, of operating the rake by means of a rigid crank-arm, as in the former case, I use an arm, I, composed of the two bars $o$ and $n$, these bars being so connected to each other as to permit of their sliding longitudinally independently of one another.

The bar $n$ is attached rigidly to the top of the vertical shaft $i$, which works in the sleeve $a$, while the sliding bar $o$ is secured to $n$ by the clasps $c$ and $c'$, the clasp $c$ being secured to the end of bar $n$, and the clasp $c'$ being secured in like manner to the bar $o$, thus holding the bars $n$ and $o$ together and in line, but permitting the bar $o$ to slide to and fro on the bar $n$, and thus to make the crank-arm I longer or shorter, according as the bar $o$ is moved in or out. By this means the crank-pin C, which is attached to the outer end of bar $o$, instead of moving in a circle around the shaft or center $i$, may have imparted to it an irregular or varying circular movement, by so arranging a guide as to cause the bar $o$ to move longitudinally while revolving horizontally with the bar $n$.

In order to so guide the bar $o$, and thereby impart to the rake B, which is moved by it, the desired movement, I attach rigidly to the top of the sleeve $a$ a cam-plate, G, the form of which is shown in Fig. 1. On the upper face of this plate I form a groove, $u$, in which a stud projecting from the under side of the bar $o$, and having a friction-roller, $e$, on it, moves.

As the crank-arm I revolves, it will be seen that the movements of the bar $o$ longitudinally will be governed by the form of the cam track or groove $u$, and that by varying the shape of this track the crank-pin C, and consequently the rake B, may be moved as desired.

In order that the rake shall be thrown to the extreme limit of its forward movement at the instant that it reaches the inner front corner of the platform, I make the cam G with a projecting point, $l$, as represented in Fig. 1, and so locate the cam that the stud, which runs in the groove $u$, shall arrive at the point $l$ at the instant the rake falls upon or reaches the inner front corner of the platform.

From the point $l$ the groove $u$ is continued in such a direction as to cause the rake B to move laterally along the line of the ridge or bar $h$, in the direction indicated by the arrow in Fig. 1; this bar $h$ serving to keep the cut grain raised slightly from the platform at that point, so that the teeth $t$ of the rake can readily take hold of the grain without resting or rubbing on the surface of the platform.

It will thus be seen that by means of the compound arm I and the cam G, I entirely obviate the difficulty arising from the use of the rake as originally constructed, and impart to it just such a movement as is required to make it perform its work perfectly.

In all other respects the rake and its operating mechanism are constructed as described in the patent hereinbefore mentioned, and need not therefore be more fully described herein.

Having thus fully described my invention, what I claim is—

The compound crank-arm I and cam G, in combination with the rake B, when mounted above the platform, and arranged to operate substantially as and for the purpose set forth.

SAML. C. RIDGAWAY.

Witnesses:
 W. C. DODGE,
 P. T. DODGE.